United States Patent
Kamel et al.

(10) Patent No.: US 6,697,343 B1
(45) Date of Patent: Feb. 24, 2004

(54) METHOD AND APPARATUS FOR CONTROLLING POWER FOR VARIABLE-RATE VOCODED COMMUNICATIONS

(75) Inventors: Raafat Edward Kamel, Westfield, NJ (US); Wen-Yi Kuo, Parsippany, NJ (US); Martin Howard Meyers, Montclair, NJ (US); Carl Francis Weaver, Hanover Township, NJ (US); Xiao Cheng Wu, Parsippany, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/383,233

(22) Filed: Aug. 26, 1999

(51) Int. Cl.[7] .............................................. G08C 17/00
(52) U.S. Cl. ....................... 370/311; 370/278; 370/332; 370/470; 455/69; 455/522; 455/574; 704/221; 714/701; 714/704
(58) Field of Search ........................ 370/310–311, 318, 370/331–333, 465, 474, 479, 328, 340; 455/574, 522, 69; 375/225; 714/701, 704, 708; 704/221

(56) References Cited

U.S. PATENT DOCUMENTS

| | | | | |
|---|---|---|---|---|
| 5,412,686 A | * | 5/1995 | Ling | 375/147 |
| 5,923,650 A | * | 7/1999 | Chen et al. | 370/331 |
| 6,094,427 A | * | 7/2000 | Yi | 370/331 |
| 6,144,861 A | * | 11/2000 | Sundelin et al. | 455/522 |
| 6,175,590 B1 | * | 1/2001 | Stein | 375/225 |
| 6,421,353 B1 | * | 7/2002 | Kim | 370/465 |
| 6,463,295 B1 | * | 10/2002 | Yun | 455/522 |

* cited by examiner

Primary Examiner—Dang Ton
Assistant Examiner—Inder Pal Mehra

(57) ABSTRACT

A base station assembles a frame including information bits at a vocoding rate for downlink transmission over a traffic channel as channel bits at a channel rate. The base station places at least one rate-indicating bit at a beginning of the frame for indicating the vocoding rate. The mobile station evaluates the downlink transmission with consideration of the vocoding rate indicated by the at least one rate-indicating bit. The mobile station can determine the vocoding rate by decoding the beginning of the frame to permit power control in less than one frame duration from initial receipt of the frame at the mobile station.

35 Claims, 2 Drawing Sheets

METHOD AND APPARATUS FOR CONTROLLING POWER FOR VARIABLE-RATE VOCODED COMMUNICATIONS

FIELD OF THE INVENTION

This invention relates to a method and apparatus for controlling electromagnetic transmit power for variable-rate vocoded communications.

BACKGROUND

Digital communication systems often use vocoders to encode voice information over an air interface. Multi-rate vocoders allow efficient use of the air-interface by reducing the information transmitted during breaks in the conversation or during silence, when no information needs to be conveyed between the mobile station and the base station. Certain multi-rate vocoders can provide rates that are proportional to the amount of speech information to be transmitted. Multi-rate vocoders can also provide rates selected to provide a desired quality of service. Generally, the full-rate or maximum rate of a vocoder corresponds to the highest quality transmission for that vocoder.

The mobile station needs to determine the vocoding rate of a received transmission to decode the transmitted information. In the past, mobile stations have waited until receiving an entire frame (or a sequence of interleaved frames) and then tried decoding the frame in accordance with each possible rate, to determine the vocoding rate. The foregoing iterative decoding approach relies upon trial and error to determine the vocoding rate. At the mobile station, each rate is tried in sequence until the decoding rate matches the transmission rate. For example, if a communication system has four possible vocoding rates, a mobile station may decode the same received frame up to four times, once for each possible rate.

The iterative decoding approach introduces a decoding delay and burdens the processing system of the mobile station. The mobile station may expend significant electrical power, while using up a battery charge, to determine the vocoding rate for each downlink transmission. Although battery life may be extended by using bulkier batteries with higher capacity for mobile stations, such battery changes reduce the portability of mobile stations. Thus, a need exists for determining vocoding rate in a manner that reduces battery consumption and the processing burden of the mobile station.

If the vocoding rate is unknown when a mobile station measures signal energy per bit-to-noise energy density (Eb/No) of a voice channel for power control purposes, Eb/No estimation may be inaccurate or slower than desired to compensate for propagational changes in the downlink transmit signal. For example, the delay associated with the iterative approach is at least one frame duration (e.g., 20 milliseconds) for decoding a received signal at the mobile station. Accordingly, communications system capacity may be reduced by deficient power control where the vocoding rate is not available until after a downlink frame or sequence of frames is received. Thus, a need exists for determining the vocoding rate prior to receiving an entire downlink frame or a sequence of frames to enhance power control performance.

SUMMARY OF THE INVENTION

In accordance with the invention, a base station assembles a frame including information bits at a vocoding rate for downlink transmission over a traffic channel as channel bits at a channel rate. The base station places at least one rate-indicating bit at a beginning of the frame for indicating the vocoding rate. The mobile station evaluates the downlink transmission with consideration of the vocoding rate indicated by the at least one rate-indicating bit. The mobile station can determine the vocoding rate by decoding the beginning of the frame, as opposed to using power-hungry, iterative decoding to determine the vocoding rate. Further, the mobile station can control downlink power with power level adjustment data based on a measured performance parameter of a downlink frame or sub-frame, prior to decoding the entire downlink frame or a series of interleaved frames. The base station receives an uplink signal with a power level adjustment data for the downlink signal.

DETAILED DESCRIPTION

Figure 1:
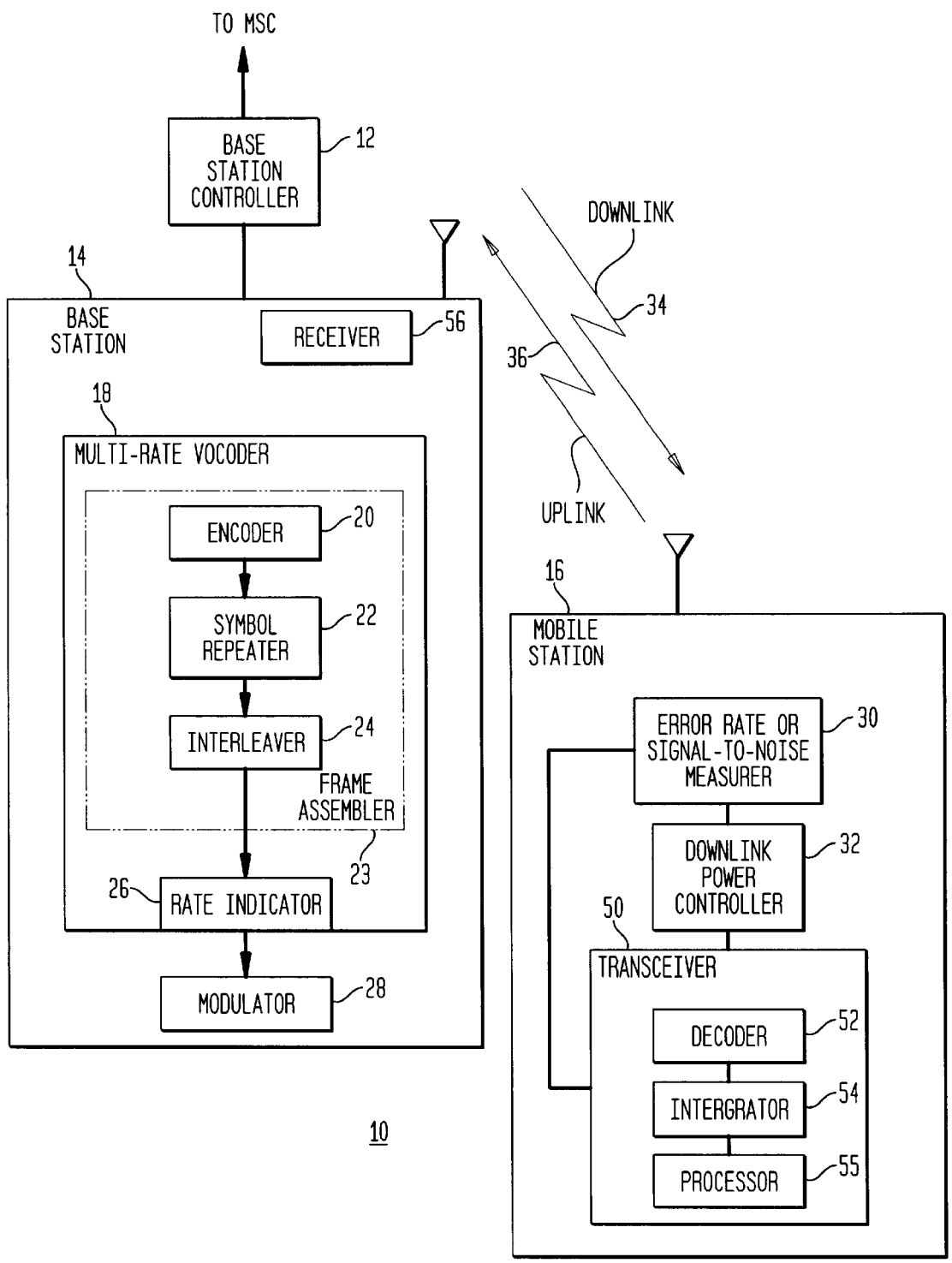
FIG. 1 is a block diagram, which illustrates a communications system in accordance with the invention.

In accordance with the invention, FIG. 1 illustrates a communications system 10 including a base station controller 12 coupled to a base station 14. The base station 14 communicates with the mobile station 16 over a downlink signal 34 transmission. The mobile station 16 communicates with the base station 14 over an uplink signal 36 transmission. The base station controller 12 may be coupled to a mobile switching center (MSC) for controlling the flow of communications traffic related to the communications system 10.

A base station 14 includes a multi-rate vocoder 18 coupled to a modulator 28. The multi-rate vocoder 18 supports different possible vocoder 18 rates ranging from a lowest rate to a full rate. For example, a multi-rate vocoder 18 for code-division multiple-access (CDMA) may support up to four possible vocoding rates, although any other number of possible vocoding rates could be supported.

The vocoding rate refers to the information rate of information bits in contrast to a channel rate of channel bits. The channel rate is preferably constant for any of the possible vocoding rates over a traffic channel. Accordingly, bits, bytes, or words of information data may be repeated as necessary to provide a channel data rate which does not vary with the vocoding rate.

A power control group (PCG) represents a fraction of a frame duration during which a transmit power adjustment may be made. For CDMA 2000 applications, a PCG is one-sixteenth of a frame duration. The PCG has a control group duration (e.g., 1.25 milliseconds) and power control bits are sent at transmit rate (e.g., 800 bits per second).

The multi-rate vocoder 18 includes a frame assembler 23 in communication with a rate indicator 26. The frame assembler 23 comprises an encoder 20 in communication with a symbol repeater 22 for repeating information bits and an interleaver 24 in communication with the symbol repeater 22. The rate indicator 26 is in communication with the interleaver 24. Other alternate interrelations of the above-mentioned components within the vocoder 18 are possible.

The encoder 20 encodes voice as digital information. The encoder 20 may use a convolutional processing to facilitate error protection or correction of information bits. The encoder 20 feeds a symbol repeater 22 which preferably repeats information bits as necessary to form channel bits with a uniform bit rate, regardless of the underlying rate of the less than full-rate vocoding of the information bits. If information bits within a frame are not at the full-rate vocoding rate, the frame contains repetition groups of identical or repeated information bits.

The interleaver 24 does not dissolve repetition groups, but rather interleaves repetition groups for every vocoding rate other than the full-rate. The interleaver 24 interleaves channel bits or information bits for full-rate vocoding because of the one-to-one correspondence of channel bits to information bits at the full-rate. The scrambling of the information bits or repetition groups provides interleaved channel bits with greater resistance to propagational fading during the transmission as the downlink signal 34 transmission.

The rate indicator 26 processes the interleaved channel bits so as to place one or more rate-indicating bits at the beginning of frame of the interleaved channel bits. The rate indicating bits indicate the information bit rate for the frame. The base station controller 12 may select an appropriate vocoding rate for the vocoder 18 and a particular mobile station based on subscriber data from a home location register (not shown), or otherwise. The multi-rate vocoder 18 provides a vocoded signal to a modulator 28. The modulator 28 modulates the vocoded signal onto the downlink signal 34. A receiver 56 receives an uplink signal 36 from the mobile station 16 that may contain power adjustment data for adjusting a transmit power of the downlink signal 34.

The mobile station 16 includes a downlink power controller 32 which is coupled to a measurer 30 and a transceiver 50. The measurer 30 measures a signal performance parameter. For example, the measurer 30 preferably comprises an error-rate measurer for measuring the error rate of the downlink signal 34 transmitted by the base station 14. The error rate signifies a bit-error rate, a frame-error rate, or super-frame error rate. The measurer 30 provides control data for the downlink power control of the base station 14 that allows the downlink power controller 32 to adjust the transmit power of the downlink transmission signal based on the measured signal performance parameter (e.g., error rate) of the downlink transmission signal. The mobile station 16 is able to adjust the downlink transmit power, before decoding the entire frame by reading one or more rate-indicating bits at the beginning of the frame. Accordingly, the mobile station 16 can adjust downlink transmit power in sufficiently short durations to compensate for the effect of Rayleigh fading.

The measured error rate is used to estimate a corresponding energy per information bit to noise spectral density ratio (Eb/No). The measured error rate may represent an error rate per information bit to facilitate determination of the Eb/No on an information bit basis. In one example, each measured error rate per bit is preferably associated with a corresponding Eb/No in a relational database or a look-up table. In another example, the Eb/No is determined by integrating over the information bits as subsequently described herein.

A closed loop power control approach varies the power transmitted by the base station 14 based on signal parameter measurements at the mobile station 16, or vice versa. Although the closed loop approach may be tolerant of longer delays in providing the downlink vocoding rate to the mobile station 16, the closed loop approach preferably makes the downlink vocoding rate available to the mobile station 16 as quickly as made possible by the rate-indicating bits to promote the integrity of the determined Eb/No. If the mobile station determines Eb/No sufficiently rapidly, the determined Eb/No may facilitate compensation for propagational changes or Rayleigh fading in the downlink transmit signal.

The multi-rate vocoder 18 can complicate the determination of the energy per information bit to noise spectral density ratio (Eb/No), as the signal performance parameter, for other than a full-rate vocoding rate. At less than full-rate vocoding, the underlying vocoding rate of the received signal does not represent a one-for-one relationship to the channel rate, as previously described. Hence, a true indication of the Eb/No of the information bits, frames, or repetition groups requires knowledge of the vocoding rate. Once the vocoding rate is known, the Eb/No, or another suitable indication of performance, may be accurately determined as soon as sufficient signal parameter measurements are available.

In an alternate embodiment, the measurer 30 preferably comprises a signal-to-noise measurer or a signal-to-interference measurer for directly measuring Eb/No of the received signal on a per information bit basis. Hence, instead of measuring the error rate and converting the error rate to a corresponding Eb/No value, the Eb/No of the received downlink transmission is measured using an integration technique over the information bits, for example.

The transceiver 50 includes a decoder 52 adapted to communicate with an integrator 54 and a processor 55 adapted to communicate with the integrator 54. The decoder 52 decodes the downlink signal 34 including information bits and one or more rate-indicating bits. The integrator 54 is arranged to noncoherently integrate over the channel bits to determine a checking vocoding rate. The processor 55 executes instructions for checking against the vocoding rate indicated by one or more rate-indicating bits.

Figure 2:
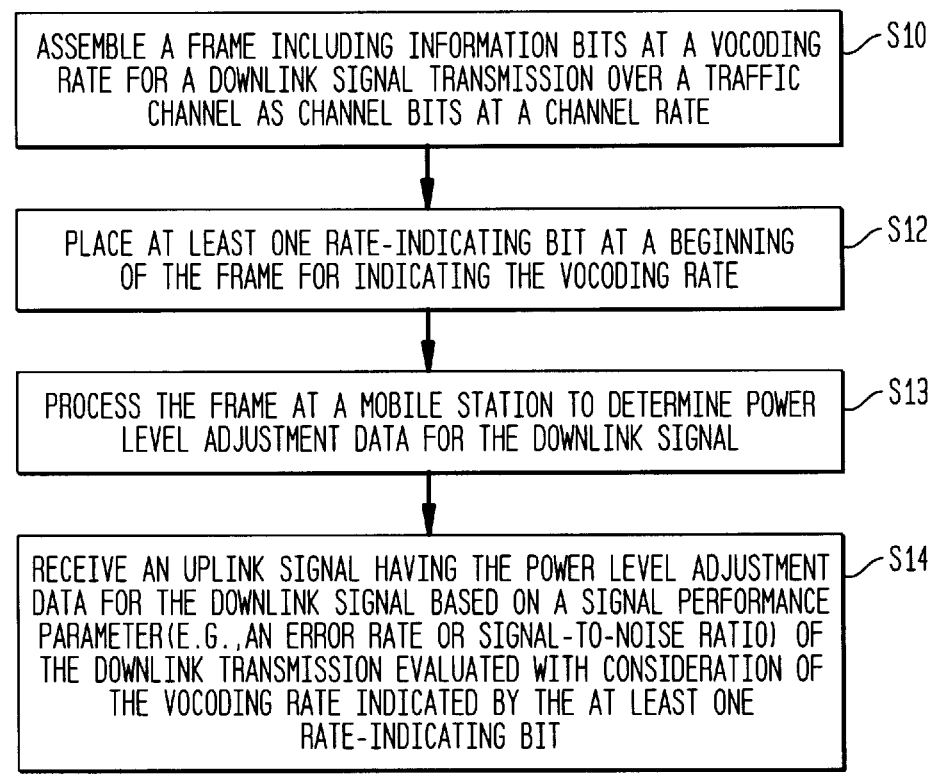
FIG. 2 is a flow chart of a method for controlling transmit power primarily from the perspective of a base station in accordance with the invention.

In accordance with the invention, a method for controlling signal power in a communications system 10 is first considered from the perspective of a base station 14 in FIG. 2. Starting in step S10, the base station 14 assembles a frame including information bits at a vocoding rate for downlink transmission over a traffic channel as channel bits at a channel rate. In practice, step S10 may further include interleaving the information bits into the frame to increase the reliability of the downlink transmission and its resistance to fading problems.

To prepare for step S12, step S10 may include reserving a reserved space at the beginning of the frame for at least one rate-indicating bit. The reserved space is restricted from receiving or containing the information bits. Step S12 may be carried out during step S10 or following step S10.

In step S12, the base station 14 places at least one rate-indicating bit at a beginning of the frame for indicating the vocoding rate of the information bits. Several possible techniques may be used to place one or more rate-indicating bits at the beginning of the frame including: (1) puncturing one or more rate-indicating bits and (2) filling a reserved space in a frame or block with one or more rate-indicating bits. Puncturing a bit or bits refers to replacing at least one of the interleaved information bits at the beginning of the frame with a rate-indicating bit.

In one example, one rate-indicating bit is punctured into a preceding frame at the beginning of the frame to indicate the information rate of a group of trailing frames trailing the frame. Here, the rate-indicating bits are preferably the first ones in the frame, although in alternate embodiments bits may be located elsewhere in the frame. Taking only one bit per frame does not detract from the decoding gain of the interleaving process as much as puncturing two bits per frame would. Accordingly, a three-fourth rate coder and higher may only use one punctured bit per frame to leave the maximum decoding gain possible with puncturing.

The puncturing of one bit per frame (e.g., 24 bit per frame) on a quarter rate code such as used in the 9.6 kbps rate of CDMA 2000 would result in very small Eb/No loss (a fraction of 1 dB), while the advantage of knowing the vocoding rate virtually on demand could easily be 2 dB in some cases. The rate-indicating bits are transmitted once per frame, which for CDMA 2000 represents one twenty-fourth of the duration of an entire frame.

In another example, two or more rate-indicating bits per frame are punctured. However, if the signal-to-noise ratio becomes unacceptable low, the base station 14 may compensate by puncturing less rate-indicating bits to retain a desired level of reliability and interleaving gain in the downlink transmission.

Filling a reserved space in a frame with rate-indicating bits accomplishes the same result as the puncturing procedure. However, if space is reserved in the frame for one or more rate-indicating bits, then one or more rate-indicating bits can be placed into a frame prior to interleaving or after interleaving. The filling of a reserved space permits different variations and flexibility in the design of the vocoder 18 or vocoding algorithm. In contrast, puncturing refers to a process where the rate indicating bits replace one or more bits in a frame after interleaving of the frame. Insertion of the punctured bits occurs before modulation by the modulator 28, but after interleaving by the interleaver 24.

The rate-indicating bits within a frame eliminate the minimum one frame delay that would otherwise be required to estimate Eb/No if an iterative decoding procedure were used to estimate the rate. The rate-indicating bits in a preceding frame may indicate the vocoding rate (i.e. information rate) so that the vocoding rate is known as soon as the first power control group (PCG) of a frame at the mobile station 16. The rate-indicating bits can be punctured into the preceding frame at the modulator 28 interface to give the mobile station 16 a full frame of advance warning about the vocoding rate of trailing or upcoming frames.

The presence and processing of rate-indicating bits does not add extra latency to the link between the mobile station 16 and the base station 14. Because bits arrive sequentially at the mobile station 16 from the vocoder 18, the mobile station 16 would otherwise wait a full frame duration until all bits are received before decoding the interleaved information.

The rate-indicating bits can reduce power consumption of the mobile station 16. Because the vocoding rate may be determined virtually on demand, multiple decoding attempts and their attendant power consumption of the iterative decoding approach are not needed. Further, power control may be tailored to achieve a probability of error on reception of the rate-indicating bits of less than one percent or another suitable target probability of error. The performance enhancement is readily realized for power control of the lower or lowest vocoding rates of the vocoder 18, which are sometimes given the lowest priority for decoding in the iterative decoding approach.

Step S13 follows step S12. Step S13 differs from the other steps in FIG. 2 in that step S13 represents processing that takes place at the mobile station 16, as opposed to at the base station 14. In general, step S13 encompasses processing the received frame at the mobile station 16 to determine power level adjustment data for an downlink signal 34 transmitted by the base station 14. For example, a mobile station 16 receives a transmitted signal containing a plurality of frames. A preceding frame contains a rate code indicating the rate of the preceding frame itself. The mobile station 16 decodes the rate-indicating bits with a decoder 31 and measures a performance parameter (e.g. the error rate or signal-to-noise) of a downlink transmission to gauge the transmit power required for adequate downlink transmission performance.

The mobile station 16 includes a measurer 30 for measuring the performance parameter after or during decoding of the rate-indicating bit or bits. The mobile station 16 measures the performance parameter after or during decoding of one or more rate-indicating bits, but preferably before decoding the entire frame. The mobile station 16 preferably determines the vocoding rate of the preceding frame before receiving the entire frame and before decoding the entire interleaved frame. Step S13 may include measuring the error rate per repetition group, determined based on the decoding of the rate-determining bit or bits.

The processing burden on the mobile station 16 and its attendant power consumption is reduced by virtually on-demand knowledge of the vocoding rate. Further, knowledge of the vocoding rate from decoding rate-indicating bits is readily used to control power in a sufficiently rapid manner to compensate for Rayleigh fading in the downlink signal 34.

In step S13, once the vocoding rate is known at the mobile station 16, the mobile station 16 may control downlink transmit power based on the measured signal performance parameter information of the received downlink signal 34 and the vocoding rate. The measured signal performance parameter may comprise a measured signal-to-noise ratio, a measured error rate, a measured signal-to-interference ratio, or another suitable indicator of signal quality. The measured performance parameter is measured considering the vocoding rate to allow a true determination of the information bit performance (or the repetition group), as opposed to the channel bit performance. The mobile station 16 transmits the downlink power level adjustment data as an uplink transmission to the base station 14. The downlink power level adjustment data reflects due consideration of the vocoding rate and the transmission/reception performance of the information bits.

In step S14, the base station 14 receives an uplink signal 36 with the power level adjustment data for the downlink signal 34. The power level adjustment data is based on the measured performance parameter (e.g., an error rate or a signal-to-noise ratio) of the downlink transmission from the base station 14 to a mobile station 16.

Figure 3:
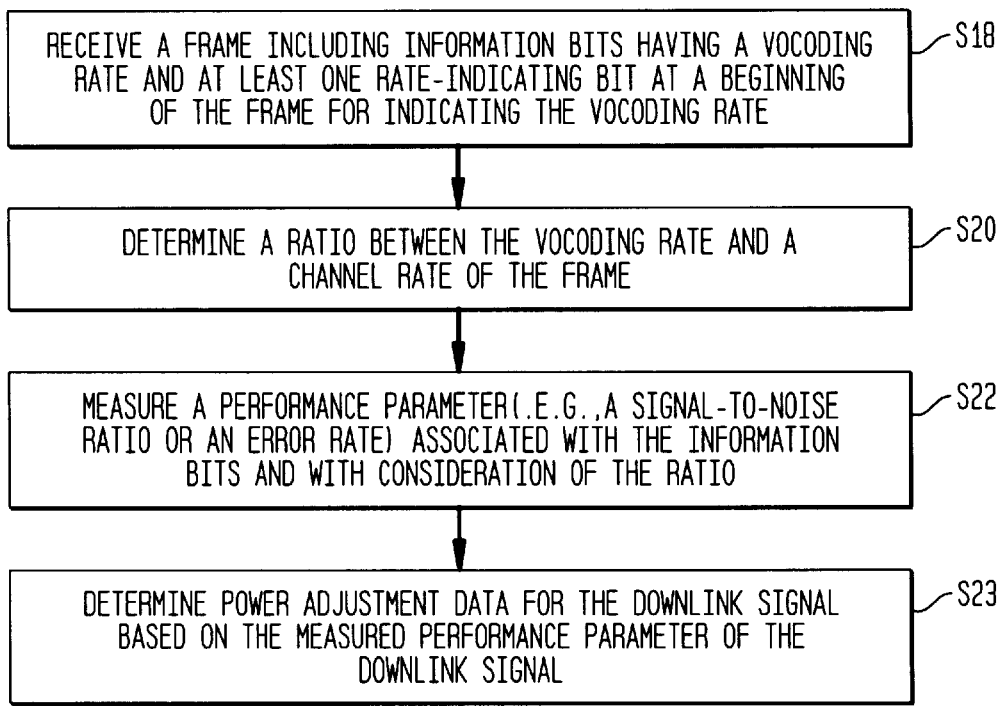
FIG. 3 is a flow chart of a method for controlling transmit power from the perspective of a mobile station in accordance with the invention.

FIG. 3 describes a method for controlling signal power in a communications system 10 from the perspective of a mobile station 16, as opposed to the base station 14. Step S13 of FIG. 2 is represented by step S18, step S20, step S22, and step S23 of FIG. 3. Accordingly, step S18 may follow step S12. Similarly, step S14 may follow step S23.

Starting in step S18, a mobile station 16 receives a frame including information bits having a vocoding rate and at least one rate-indicating bit at a beginning of the frame for indicating the vocoding rate. The use of rate-indicating bits reduces the complexity, power consumption, and manufacturing cost for the mobile station 16 by eliminating the onerous iterative rate determination procedures. The mobile station 16 readily acquires the vocoding rate before decoding the first frame or under one frame duration. Furthermore, the mobile station 16 preferably determines the vocoding rate within a fractional increment of the frame, referred to as the power control group (PCG). For example, the mobile station 16 may determine the vocoding rate within the first sixteenth of a frame because power control in CDMA 2000 should be capable of power control adjustment for every one-sixteenth of a frame on the forward link.

Following step S18, in step S20, the mobile station 16 determines a ratio between the vocoding rate and a channel rate of the frame. The mobile station 16 reads at least one rate-indicating bit at the beginning of the frame. The determination of the ratio allows the performance to be referenced with respect to the information bit (or repetition group), as opposed to all channel bits generally. If the performance parameter were based on channel bits, the performance parameter would form a misleading basis for uplink power control. For the vocoder 18 operating in the full-rate mode, there is one-to-one mapping between the information bits and the channel bits. However, for the lower and lowest rate, each repetition group contains n information bits repeated m times to provide n multiplied by m channel bits. A frame may contain P repetition groups such that the number C of channel groups per frame equals P multiplied by n and m (i.e., $C=P*n*m$). If the traffic channel is used to measure signal energy per bit to noise energy per bit duration (Eb/No) as the performance parameter, the ratio is used for an accurate measurement.

The vocoding rate can be confirmed by checking the value of noncoherent integration of the channel bits. The noncoherent integration of the channel bits adds redundancy or error-checking capability to the vocoding rate determination, providing increased reliability in case where a rate-indicating bit in a frame is corrupt. If the result of non-coherent integration of eight adjacent, noninterleaved channel bits within a frame is small or approaches zero, the vocoding rate can be assumed to be at the full vocoding rate. On the other hand, if the result of the non-coherent integration within a frame exceeds zero by a threshold tolerance, then the vocoding rate is less than the full vocoding rate of the multi-rate vocoder 18. The threshold tolerance is determined based on a statistical analysis or probability density function of the typical or anticipated frame contents. The vocoding rate indicated by one or more rate-indicating bits may be compared to the vocoding rate indicated by the above non-coherence integration technique to achieve error checking.

In step S22, the mobile station 16 measures a signal performance parameter (e.g., an error rate or signal-to-noise ratio) associated with the information bits or the repetition group based on the measurement period. Step S22 may be accomplished by measuring a performance parameter after decoding one or more rate indicating bits. Step S22 may include measuring the performance parameter (e.g., error rate) after or while decoding one or more rate indicating bits, but prior to decoding the entire frame.

In measuring the signal-to-noise ratio as the signal performance parameter for an electromagnetic signal underlying a frame, the signal-to-noise ratio may be determined by noncoherently integrating the signal power per information bit over an integration period corresponding to the vocoding rate. In particular, the signal-to-noise ratio may be estimated by noncoherently integrating channel bits or information bits if a vocoding rate is at a full rate. For full-rate vocoding, noncoherent integration produces adequate results because the channel bits to information bits are mapped one-to-one. In contrast, at the lowest rate (e.g., one eighth rate) noncoherent integration of the channel bits directly will not produce accurate estimates of the signal-to-noise ratio. The noncoherent integration at the lowest vocoding rate must be accomplished at the information bit level or at the repetition group level, rather than the channel bit level.

To measure the signal-to-noise ratio, the integration period is increased for a lower vocoding rate lower than a full-rate vocoding rate. The integration period is increased by a reciprocal of the decrease of the vocoding rate relative to the full-rate. For example, an integration period for a one-eight rate vocoding rate is eight times as long as the integration period for a full-rate vocoding rate.

The signal-to-noise ratio (S/N) may be approximated by first determining signal strength plus noise level (S+N). The S+N of the information bits or traffic bits may be estimated by non-coherent integration over the information bits. Second, the noise level (N) or density is measured or otherwise determined. The noise level may include interference associated with the signal. To obtain the S/N, noise level (N) is subtracted from the S+N. The result of the subtraction represents the signal strength (S), which is divided by N to obtain the signal to noise ratio.

Notwithstanding the foregoing paragraph, a signal plus noise estimate (S+N) provides an accurate indication of the signal power S if the noise level N is low compared to the signal power S. However, if the signal S is weak, the signal to noise ratio (S/N) will approach a value of one, rather than its true value. Other techniques other than the signal plus noise estimation technique may be used to determine the signal-to-noise ratio.

The mobile station 16 estimates the noise level to determine the signal-to-noise ratio. The noise level can be derived from the reception of the downlink pilot channel. The downlink pilot sequence is usually a train of uniform polarity symbols (e.g., 1). The mean squared of the downlink pilot sequence divided by the variance provides the noise level.

The mobile station 16 approximates the signal power of the received downlink signal 34 in the following manner. The absolute values of measured signal strengths per bit are summed up to attain an absolute value representing a signal plus noise estimate. If the vocoding rate is lower than the full-rate vocoding rate, coherent integration of the downlink signal 34 power over repeated traffic bits may be required to properly estimate the signal-to-noise ratio. Non-coherent integration over different traffic bits may yield enough accuracy if used with the rate information gained from a previous coherent integration procedure.

Following step S22 in step S23, the mobile station 16 determines power adjustment data for the downlink signal 34 based on the measured signal performance parameter and the ratio between the vocoding rate and a channel rate of the received frame. The mobile station 16 controls the downlink transmit power of the base station 14 based on the measured signal performance parameter and the vocoding rate.

The mobile station 16 controls the downlink transmit power of the base station 14 based on the measured signal performance parameter to maintain a target signal performance parameter stored at the mobile station 16. For example, the mobile station 16 may control downlink transmit power of a base station 14 based on the measured error rate to maintain a target performance parameter value. Alternately, the mobile station 16 may control the downlink transmit power of the base station 14 based on the measured signal-to-noise ratio as the measured signal performance parameter.

The downlink transmit power of the base station 14 may be adjusted with the downlink power level data prior to the receipt and decoding of an entire frame at the mobile station 16. Accordingly, downlink transmit power can be changed multiple times per frame to compensate for Rayleigh fading because the vocoding rate may be known as early as the first power control group or fractional interval of a frame. In accordance with the invention, attaining a vocoding rate, measuring a signal performance parameter based on the vocoding rate, and controlling downlink power based on the measured signal performance parameter and the vocoding rate may be completed in less than one frame duration from initial receipt of the frame at the mobile station, which permits real-time power control and/or compensation against fast or medium fading, such as Rayleigh fading.

The power control method of the invention is well-suited for reducing power consumption and extending battery life of the mobile station 16. The power control method can be implemented by software plus an application specific integrated circuit (ASIC) for many commercially available mobile stations 16. The power control method is well-suited to voice communications because voice communications are intolerant of long delays. The system is primarily geared to forward power control of a downlink signal 34 power using an uplink signal 36. In contrast, on the reverse link, each mobile station 16 has one corresponding pilot channel which has a transmit power independent of the vocoding rate. Therefore, the base station 14 can readily determine the uplink power of the mobile station 16 without decoding the vocoding rate based on measurements of the pilot channel.

Although the aforementioned rate-indicating bits have been used to indicate the information rate for the frame into which the rate-indicating bits are placed, in an alternate configuration, the rate-indicating bits may be placed into a leading frame to indicate the information bit rate for one or more trailing frames following the leading frame. Accordingly, rate-indicating bits are only placed (e.g., punctured) into the leading frame upon a change in the information rate to facilitate greater interleaving performance than would otherwise be possible by puncturing each and every frame with rate-indicating bits.

This specification describes various illustrative embodiments of the method and structure of the present invention. The scope of the claims is intended to cover various modifications and equivalent arrangements of the illustrative embodiments disclosed in the specification. Therefore, the following claims should be accorded the reasonably broadest interpretations to cover the modifications, equivalent structures, and features, which are consistent with the spirit and the scope of the invention disclosed herein.

We claim:

1. A method for reducing energy consumption of a mobile station in a communications system, the method comprising the steps of:

assembling a frame including information bits at a vocoding rate for a downlink signal transmission over a traffic channel as channel bits at a channel rate;

placing at least one rate-indicating bit at a beginning of the frame to indicate the vocoding rate; and receiving an uplink signal with power level adjustment data based on a ratio of an information rate and transmission rate of a previously sent frame.

2. The method according to claim 1 wherein the assembling step further comprises:

interleaving the information bits into the frame.

3. The method according to claim 2 wherein the placing step further comprises:

replacing at least one of the interleaved information bits at the beginning of the frame with the at least one corresponding rate-indicating bit.

4. The method according to claim 1 wherein the assembling step further comprises the step of:

reserving a space at the beginning of the frame for the at least one rate-indicating bit, the reserved space being restricted with respect to the presence of the information bits.

5. The method according to claim 1 wherein the placing step further comprises:

puncturing two rate-indicating bits at the beginning of the frame to indicate the information rate of a group of trailing frames trailing the frame.

6. A method for controlling signal power in a communications system, the method comprising the steps of:

assembling a frame including information bits at a vocoding rate for a downlink signal transmission over a traffic channel as channel bits at a channel rate; and placing at least one rate-indicating bit at a beginning of the flame to indicate the vocoding rate; and receiving an uplink signal with power level adjustment data for the downlink signal determined based upon a signal performance parameter of the downlink signal transmission and the vocoding rate indicated by the at least one rate-indicating bit; wherein the power level adjustment data is based on a ratio of an information rate and a transmission rate of a previously sent frame.

7. The method according to claim 6 wherein the receiving step further comprises receiving the uplink signal with the power level adjustment data determined using an error rate as the signal performance parameter.

8. The method according to claim 6 further comprising the step of:

measuring an error rate, as the signal performance parameter, at a mobile station after decoding the at least one rate-indicating bit.

9. The method according to claim 6 further comprising the step of:

measuring an error rate, as the signal performance parameter, at a mobile station after decoding the at least one rate-indicating bit and prior to decoding the entire frame.

10. The method according to claim 6 wherein the assembling step further comprises:

interleaving the information bits into the frame.

11. The method according to claim 10 wherein the placing step further comprises:

replacing at least one of the interleaved information bits at the beginning of the frame with the at least one corresponding rate-indicating bit.

12. The method according to claim 6 wherein the assembling step further comprises the step of:

reserving a space at the beginning of the frame for the at least one rate-indicating bit, the reserved space being restricted with respect to the presence of the information bits.

13. The method according to claim 6 wherein the placing step further comprises:

puncturing two rate-indicating bits at the beginning of the frame to indicate the information rate of a group of trailing frames trailing the frame.

14. The method according to claim 6 further comprising the step of:

measuring an error rate of the information bits over a plurality of successive measurement periods determined based upon decoding the at least one rate-indicating bit.

15. A method for controlling signal power in a communications system, the method comprising the steps of:

receiving a frame including information bits having an information rate and including at least one rate-indicating bit at a beginning of the frame to indicate the information rate;

determining a ratio between the information rate and a transmission rate of the frame; and measuring a signal performance parameter associated with the information bits, with consideration of the determined ratio.

16. The method according to claim 15 wherein the measuring step includes measuring an error rate as the signal performance parameter.

17. The method according to claim 15 further comprising the step of measuring an error rate, as the signal performance parameter, after decoding the at least one rate-indicating bit.

18. The method according to claim 17 further comprising the step of:

controlling downlink transmit power based on the measured error rate.

19. The method according to claim 18 wherein the controlling step further comprises:

sending an uplink signal containing power adjustment data for the downlink transmit power.

20. The method according to claim 15 further comprising the step of measuring an error rate, as the signal performance parameter, after decoding the at least one rate indicating bit and prior to decoding the entire frame.

21. The method of claim 15 further comprising the step of:

controlling downlink transmit power based on the measured signal performance parameter to maintain a target signal performance parameter.

22. A method for controlling signal power in a communications system, the method comprising the steps of:

receiving a frame including information bits having a vocoding rate and including at least one rate-indicating bit at a beginning of the frame for indicating the vocoding rate;

determining a ratio between the vocoding rate and a transmission rate of the frame; and measuring a signal-to-noise ratio associated with the information bits based on the ratio.

23. The method according to claim 22 further comprising the step of:

estimating the signal-to-noise ratio for an electromagnetic signal underlying the frame, the signal-to-noise ratio being determined by noncoherently integrating signal power per information bit over an integration period corresponding to the vocoding rate.

24. The method according to claim 23 wherein the estimating step includes noncoherently integrating channel bits representing information bits on a one-to-one basis if a vocoding rate is at a full rate.

25. The method according to claim 22 wherein the measuring step includes measuring a signal power over a repetition-group duration during reception of a repetition group within the frame.

26. The method according to claim 22 further comprising the step of controlling downlink transmit power based on the measured signal to noise ratio.

27. A vocoder comprising:

a frame assembler for assembling a frame including information bits at a voding rate for a downlink signal transmission over a traffic channel as channel bits at a channel rate;

a rate indicator for placing a t least one rate-indicating bit at a beginning of the frame to indicate the vocoding rate; and a receiver for receiving an uplink signal with power level adjustment data for the downlink signal determined based upon a signal performance parameter of the downlink signal transmission and the vocoding rate indicated by the at least one rate-indicating bit; wherein the power level adjustment data is based on a ratio of an information rate and a transmission rate of a previously sent frame.

28. The vocoder according to claim 27 wherein the frame assembler further comprises an encoder for encoding the information bits, a symbol repeater for repeating the encoded information bits in conformance with the vocoding rate, and an interleaver for interleaving the repeated information bits within at least one frame.

29. The vocoder according to claim 27 wherein the rate indicator is adapted to puncture the at least one rate indicating bit into the interleaved information symbols.

30. The vocoder according to claim 27 wherein rate indicator is adapted to reserve a space at the beginning of each frame for the at least one rate indicating bit.

31. A mobile station comprising:

a transceiver for receiving a frame including information bits having an information rate and including at least one rate-indicating bit at a beginning of the frame to indicate the information rate;

a processor for determining a ratio between the information rate and a transmission rate of the frame; and a measurer for measuring a signal performance parameter associated with the information bits, with consideration of the determined ratio.

32. The mobile station according to claim 31 wherein the signal performance parameter comprises an error rate.

33. The mobile station according to claim 31 wherein the measurer is adapted to measure an error rate, as the signal performance parameter, after decoding the at least one rate-indicating bit and prior to decoding the entire frame.

34. The mobile station according to claim 31 further comprising:

a downlink power controller for controlling downlink transmit power based on the measured error rate.

35. The mobile station according to claim 31 further comprising:

an integrator for noncoherently integrating over the channel bits to determine a checking vocoding rate for checking against the vocoding rate indicated by the at least one rate indicating bit.

* * * * *